US010008232B2

(12) United States Patent
Tonegawa et al.

(10) Patent No.: US 10,008,232 B2
(45) Date of Patent: Jun. 26, 2018

(54) RECORDING MEDIUM, METHOD OF MANUFACTURING FULLERENE THIN FILM, RECORDING REPRODUCING APPARATUS, INFORMATION RECORDING METHOD, AND INFORMATION READING METHOD

(71) Applicant: SHOWA DENKO K.K., Tokyo (JP)

(72) Inventors: Sho Tonegawa, Tokyo (JP); Masatoshi Ichikawa, Tokyo (JP); Kenzo Hanawa, Tokyo (JP)

(73) Assignee: SHOWA DENKO K.K., Tokyo (JP)

(*) Notice: Subject to any disclaimer, the term of this patent is extended or adjusted under 35 U.S.C. 154(b) by 0 days. days.

(21) Appl. No.: 15/529,614

(22) PCT Filed: Jun. 28, 2016

(86) PCT No.: PCT/JP2016/069117
§ 371 (c)(1),
(2) Date: May 25, 2017

(87) PCT Pub. No.: WO2017/002798
PCT Pub. Date: Jan. 5, 2017

(65) Prior Publication Data

US 2017/0263277 A1 Sep. 14, 2017

(30) Foreign Application Priority Data

Jun. 30, 2015 (JP) ................................ 2015-131656
Feb. 29, 2016 (JP) ................................ 2016-038355

(51) Int. Cl.
*G11B 9/14* (2006.01)
*G11B 9/04* (2006.01)

(52) U.S. Cl.
CPC .................. *G11B 9/04* (2013.01); *G11B 9/14* (2013.01); *G11B 9/149* (2013.01)

(58) Field of Classification Search
None
See application file for complete search history.

(56) References Cited

U.S. PATENT DOCUMENTS 5,547,774 A * 8/1996 Gimzewski ............ B82Y 10/00 365/117
7,026,676 B2 * 4/2006 Ahner ...................... G11B 9/02 257/255

(Continued)

FOREIGN PATENT DOCUMENTS

EP 0591595 A1 * 4/1994 ............. B82Y 10/00
EP 1 063 196 A2 12/2000

(Continued)

OTHER PUBLICATIONS

Communication dated May 30, 2017, from the Japanese Patent Office in counterpart application No. 2017-522579.

(Continued)

*Primary Examiner* — William J Klimowicz
(74) *Attorney, Agent, or Firm* — Sughrue Mion, PLLC

(57) ABSTRACT

According to the present invention, there is provided a recording medium comprising a substrate, a platinum layer formed on the substrate and having a (111) plane preferentially oriented, and a fullerene single crystal thin film formed on the platinum layer, and configured to be a recording layer, wherein an average value of average surface roughness Ra's with respect to four or more visual fields measured by using an atomic force microscope in a surface of the fullerene thin film is 0.5 nm or less.

11 Claims, 5 Drawing Sheets

(56) References Cited

U.S. PATENT DOCUMENTS

| | | | | |
|---|---|---|---|---|
| 2004/0228024 | A1* | 11/2004 | Ogawa | B82Y 10/00<br>360/69 |
| 2005/0077468 | A1 | 4/2005 | Baur et al. | |
| 2005/0095463 | A1* | 5/2005 | Furusawa | B82Y 10/00<br>428/833.6 |

FOREIGN PATENT DOCUMENTS

| | | | | | |
|---|---|---|---|---|---|
| JP | 2001-009961 | A | | 1/2001 | |
| JP | 2004-342183 | A | | 12/2004 | |
| JP | 2014-099236 | A | | 5/2014 | |
| WO | 2008/114782 | A1 | | 9/2008 | |
| WO | WO-2017002798 | A1 | * | 1/2017 | G11B 9/04 |

OTHER PUBLICATIONS

D. Stifter, et al., "Hot Wall epitaxy of $C_{60}$ thin films on mica", Appl. Phys. Lett., Feb. 6, 1995, pp. 679-681, vol. 66, No. 6.

K. S. Novoselov, et al., "Two-dimensional atomic crystals", Proc. Natl. Acad. Sci., Jul. 26, 2005, pp. 10451-10453, vol. 102, No. 30.

O. Benamara, et al., "Growth of platinum ultrathin films on $Al_2O_3$(0001)", Surface Science, 2011, pp. 1906-1912, vol. 605.

International Search Report for PCT/JP2016/069117 dated Sep. 6, 2016 [PCT/ISA/210].

Written Opinion for PCT/JP2016/069117 dated Sep. 6, 2016 [PCT/ISA/237].

* cited by examiner

RECORDING MEDIUM, METHOD OF MANUFACTURING FULLERENE THIN FILM, RECORDING REPRODUCING APPARATUS, INFORMATION RECORDING METHOD, AND INFORMATION READING METHOD

CROSS REFERENCE TO RELATED APPLICATIONS

This application is a National Stage of International Application No. PCT/JP2016/069117 filed Jun. 28, 2016, claiming priority based on Japanese Patent Application Nos. 2015-131656 filed Jun. 30, 2015 and 2016-038355 filed Feb. 29, 2016, the contents of all of which are incorporated herein by reference in their entirety.

BACKGROUND OF THE INVENTION

Field of the Invention

The present invention relates to a recording medium, a method of manufacturing a fullerene thin film, a recording reproducing apparatus, an information recording method, and an information reading method.

Priority is claimed on Japanese Patent Application No. 2015-131656, filed on Jun. 30, 2015, and Japanese Patent Application No. 2016-038355, filed on Feb. 29, 2016, the contents of which are incorporated herein by reference.

Background Art

PTL 1 discloses a recording medium having a fullerene molecular multilayer film on a surface of a conductive substrate. Furthermore, PTL 1 also discloses a method of recording information while scanning a probe of a scanning tunneling microscope (STM) on the recording medium.

CITATION LIST

Patent Literature

[PTL 1] Japanese Unexamined Patent Application, First Publication No. 2014-99236

Non-Patent Literature

[NPL 1] D. Stifter and H. Sitter, "Hot wall epitaxy of $C_{60}$ thin films on mica", Appl. Phys. Lett. 66, 679 (1995)

[NPL 2] K. S. Novoselov et al., "Two-dimensional atomic crystals", Proc. Natl. Acad. Sci. U.S.A 102, 10451 (2005)

SUMMARY OF THE INVENTION

At present, approximately 80% of digital signals are stored in hard disks using magnetic recording in terms of a capacity thereof. It is clear that information to be recorded will increase in the future. Since the recording density of hard disks has been improving at a speed that exceeds the amount of the information to be recorded, there has been no need to worry about an increase in the amount of the information to be recorded. However, it is generally recognized that the maximum recording density of a hard disk is substantially 500 GB/Platter (0.8 Tbit/$in^2$) when the diameter is 65 mm (2.5 inches), and various proposals for future technologies have been made, but an influential technology has not been appeared. Various methods for embedding a signal in each molecule or each atom have been proposed as a recording method that achieves high recording density.

The major characteristic of a hard disk drive is that a recording layer on which the information is recorded, may be a solid film (continuous film, film without pattern). This is possible because a mechanism that allows a head to fly in the vicinity of the surface of a disk while the disk is rotated is used.

It is recognized that high densification of the recording in accordance with a method of performing reading and writing by allowing the head to fly above the hard disk is reaching its limit, and various methods which are different therefrom have been proposed. In recognition that the recording density of hard disks is currently reaching its limit, a mechanism that performs the reading and writing by changing the direction of a magnetic field is reaching its limit in actuality. That is, since there is a need to enhance coercive force as a recording unit becoming small, a stronger magnetic field is necessary for the writing. On the other hand, there is a need to reduce the size of the writing head as the recording density is enhanced. Accordingly, it is necessary to confine a strong magnetic field to a small area, which becomes difficult. Therefore, there is a demand for a new technical development in mechanisms that perform reading and writing.

As a result of research, the present invention is completed by manufacturing a hard disk media (medium) obtained by forming a fullerene $C_{60}$ single crystal thin film thereon as a recording layer, above which the head can fly, in place of conventional magnetic material films.

In order to manufacture the fullerene single crystal thin film, a method is provided for preparing a single crystal substrate of a heterogeneous material, and for making heteroepitaxial growth thereon. Examples in which the $C_{60}$ single crystal film has been grown on various materials such as mica, Si, and highly oriented pyrographite by using a molecular beam epitaxy method, a vacuum evaporation method or the like have been reported. Among these examples, the finest crystallinity was obtained when the $C_{60}$ single crystal thin film was grown on mica (NPL1). However, NPL 1 is merely an example in which crystallinity can be narrowly evaluated by an unusually large film thickness, i.e., 150 nm, and a $C_{60}$ single crystal thin film having a small thickness of approximately 3 nm which is obtained by the present invention of this specification (described later) is not disclosed. In a case where a device is driven by voltage, a fullerene layer formed directly on an insulating substrate such as mica cannot be used, since it is difficult to draw out electrical properties. In PTL 1, a recording medium having a fullerene molecular multilayer film on a surface of a conductive substrate is disclosed. But the fullerene molecular multilayer film is just a molecular multilayer film. There is not shown an evidence that the film is a single crystal film. In PTL 1, a Si substrate is used as a conductive substrate, and an underlayer is made by forming an Ag layer on Si, but there is a problem in that oxidation or sulfuration occurs when used in the atmosphere due to the low corrosion resistance of Ag. The highly oriented pyrographite can partially have a high quality surface by a mechanical peeling, but it is not suitable for industrial production since only approximately micrometer-sized crystal can be formed (see NPL 2).

An object of the present invention is to provide a method that enables the manufacture of a fullerene thin film with suitable corrosion resistance over a large area.

Moreover, an object of the present invention is to provide a recording medium using the fullerene thin film for an information recording layer, a method of manufacturing a fullerene thin film, a recording driving apparatus, an information recording method, and an information reading method.

The present invention includes the following aspects.

(1) A recording medium including a substrate, a platinum layer formed on the substrate and having a (111) plane preferentially oriented, and a fullerene single crystal thin film formed on the platinum layer and configured to be a recording layer, in which an average value of average surface roughness Ra's with respect to four or more visual fields measured by using an atomic force microscope in a surface of the fullerene thin film is 0.5 nm or less.

(2) The recording medium according to (1), in which the fullerene thin film is a single crystal thin film.

(3) The recording medium according to (1) or (2), in which a rocking curve half-value width of a (111) diffraction peak in X-ray diffraction of the platinum layer is 0.1° or less.

(4) The recording medium according to any one of (1) to (3), in which a rocking curve half-value width of a (220) diffraction peak in X-ray diffraction of the platinum layer is 4° or less.

(5) The recording medium according to any one of (1) to (4), in which the substrate has a disk shape.

(6) The recording medium according to (5), in which in a head flight test which is performed by rotating the recording medium, and using a DFH (Dynamic Flying Height) head, an AE (Acoustic Emission) output voltage is 0.1 V or less at the time of seeking the DFH head above the surface of the fullerene thin film.

(7) The recording medium according to any one of (1) to (6), in which the substrate is a sapphire substrate.

(8) A method of manufacturing a fullerene thin film including a step of forming a platinum layer by sputtering on a substrate, and a step of forming a fullerene layer by vacuum evaporation on the platinum layer.

(9) The method of manufacturing a fullerene thin film according to (8), in which the fullerene layer is a single crystal thin film.

(10) The method of manufacturing a fullerene thin film according to (8) or (9), in which a temperature of the substrate is 400° C. to 900° C. in the step of the sputtering.

(11) The method of manufacturing a fullerene thin film according to any one of (8) to (10), in which the temperature of the substrate is 400° C. to 900° C., and annealing is performed after the step of the sputtering.

(12) The method of manufacturing a fullerene thin film according to any one of (8) to (11), in which the substrate is a sapphire substrate.

(13) The method of manufacturing a fullerene thin film according to any one of (8) to (12), in which the temperature of the substrate is 100° C. to 200° C. in the step of forming the fullerene layer.

(14) The method of manufacturing a fullerene thin film according to any one of (8) to (13), in which the temperature of the substrate is 100° C. to 200° C., and annealing is performed after the step of forming the fullerene layer.

(15) A recording driving apparatus including the recording medium according to any one of (1) to (7).

(16) The recording reproducing apparatus according to (15), further including a medium driving unit that rotatably drives the recording medium, a reading/writing head that performs writing of information, and reading of the recorded information with respect to the recording medium by an electrical method, a head driving unit that moves the reading/writing head relatively to the recording medium, and a recording reproducing signal processing system that performs processing of an electrical signal in order to perform reading/writing of information with respect to the recording medium by the reading/writing head.

(17) An information recording method of recording information in the fullerene thin film by using the recording medium according to any one of (1) to (7), that is a disk shaped recording medium, in which the information is recorded in the fullerene thin film by, while the recording medium is rotating, making a writing head approach the surface of the fullerene thin film of the recording medium, moving the writing head in an approximately radial direction of the recording medium, positioning the writing head at a desired track of concentric tracks, and locally applying a voltage of a predetermined intensity to the fullerene thin film with the writing head.

(18) An information reading method of reading information which is recorded in the fullerene thin film by using the information recording method according to (17), in which the recorded information is read by, while the recording medium is rotating, making a reading head approach the surface of the fullerene thin film of the recording medium, moving the reading head in an approximately radial direction of the recording medium, positioning the reading head at a desired track of concentric tracks, and detecting the difference of current between a spot where the information is recorded and a spot where the information is not recorded with the reading head.

By the present invention, a fullerene thin film of fine crystallinity in a large area is obtained.

By the present invention, it is possible to provide a recording medium using a fullerene thin film of fine crystallinity in a large area for an information recording layer, a method of manufacturing a fullerene thin film, a recording reproducing apparatus, an information recording method, and an information reading method.

DETAILED DESCRIPTION OF THE INVENTION

Figure 1:
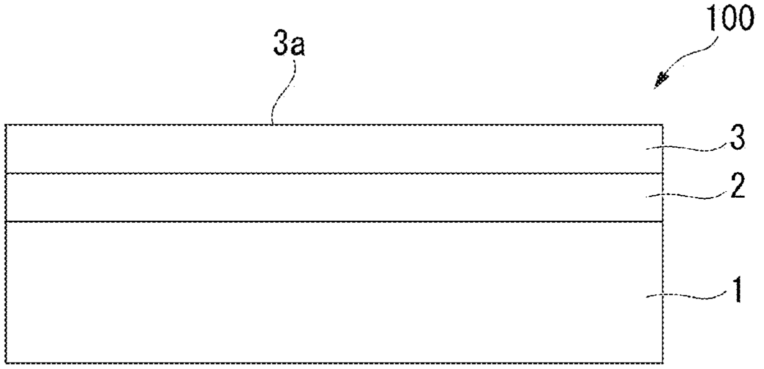
FIG. 1 is a schematic sectional view illustrating an example of a recording medium according to an embodiment of the present invention.

Hereinafter, embodiments for carrying out the present invention will be described.

In the drawings used for the following description, there is a case where characteristic portions are illustrated by being enlarged for the sake of convenience in order to easily understand the characteristics, and a dimensional ratio or the like of each component is not limited to be the same as an actual value. A material, a dimension or the like exemplified in the following description is merely an example, and the present invention is not limited thereto, and can be carried out by being appropriately modified within a range where effects of the present invention are achieved. A configuration indicated by one embodiment can be applied to other embodiments.

Either of "layer" and "thin film" is used to mean a thin layer or a thin film.

(Recording Medium)

FIG. 1 is a schematic sectional view illustrating an example of a recording medium according to an embodiment of the present invention.

A recording medium 100 according to the embodiment includes a substrate 1, a platinum layer 2 formed on the substrate 1 and in which a (111) plane is preferentially oriented, and a fullerene thin film 3 formed on the platinum layer and configured to be a recording layer, wherein an average value of average surface roughness Ra's with respect to four or more visual fields measured by using an atomic force microscope (AFM) in a fullerene thin film surface 3*a* is 0.5 nm or less.

Here, measuring of the average value is performed as follows. The visual field where the average surface roughness Ra is measured by the atomic force microscope is 1 μm×1 μm. The measurement is performed with respect to four or more visual fields on the surface of the fullerene thin film, and the average value thereof is calculated. For example, in the case of a disk shaped recording medium, the four or more visual fields are set at positions on a same circumference substantially equally dividing the circumferential length. The position in a radial direction of the same circumference is in the middle of the maximum radius and the minimum radius of a region where the fullerene thin film is formed. If the average value of the average surface roughness Ra's with respect to four or more visual fields by the atomic force microscope is 0.5 nm or less, a head used in a head flight test of the current hard disk can fly. Specifically, in the head flight test which is performed by rotating the recording medium, and using a DFH (Dynamic Flying Height) head, an AE (Acoustic Emission) output voltage is 0.1 V or less at the time of seeking the DFH head in the radial direction on the surface of the fullerene thin film.

It is preferable that the fullerene thin film is a single crystal thin film. A crystal grain boundary is not present by being the single crystal thin film, and it is possible to easily obtain a flatness by which the head used in the head flight test can fly.

An example of a result obtained by measuring the surface roughness of the fullerene thin film in the recording medium of the present invention by using the atomic force microscope (product name: Nanoscope, manufactured by Digital Instruments Company) is indicated below.

The measured recording medium is a recording medium in which a substrate is sapphire (diameter 65 mm), a platinum layer (film thickness: 10 nm) is formed thereon by sputtering, and a $C_{60}$ layer (film thickness: 3 nm) is formed on the platinum layer by vacuum evaporation.

Manufacturing conditions of the recording medium are as follows;

The sputtering in the forming of the platinum layer is performed under the conditions of 100 W, 20 seconds, Ar gas 0.27 Pa, and a substrate temperature 500° C. Moreover, the vacuum evaporation in the forming of the $C_{60}$ layer is performed under the conditions of 400° C., 20 seconds, and the substrate temperature 190° C.

The results obtained by measuring the average surface roughness Ra's with respect to four visual fields (1 μm×1 μm) at the positions equally dividing the circumference having the diameter of approximately 40 mm into quarters in the surface of the manufactured recording medium, are respectively 0.38 nm, 0.44 nm, 0.40 nm, and 0.50 nm, and the average value thereof is 0.43 nm.

(Substrate)

For example, a single crystal substrate such as sapphire, silicon, MgO(111), $SrTiO_3$(111), and $LaAlO_3$(111) can be used as a substrate. The sapphire is preferable in order to enhance crystallinity of the fullerene single crystal thin film.

If the film of the platinum is formed on the sapphire single crystal substrate, the platinum thin film (platinum layer) whose (111) plane is preferentially oriented is formed. It is important that the above thin film is single crystal throughout the entire surface. If the substrate is a single crystal substrate, it is possible to grow monocrystals of a platinum (111) layer, but sapphire is preferable from the viewpoint of lattice matching properties.

In the viewpoint of epitaxially growing the platinum (111) layer, the single crystal substrate whose (0006) plane of the sapphire is exposed on the surface is more preferable.

If $C_{60}$ is evaporated directly on the sapphire single crystal substrate, $C_{60}$ moves on the substrate, and an island-shaped structure is easily formed. However, if $C_{60}$ is evaporated on platinum, $C_{60}$ can grow as a layer since platinum has a strong interaction with $C_{60}$.

If the platinum layer is a single crystal thin film, it is possible to form a $C_{60}$ film which is formed thereon into the single crystal thin film. If there is a large grain boundary, the grain boundary becomes a step difference, and the flight of the head may be hindered in a case where the $C_{60}$ film is used as a recording layer of the recording medium.

The shape of the substrate is not limited, but in a case of being used in replacement of the current magnetic recording medium, the substrate is required to have a disk shape to rotate it, and has a hole for fixing a spindle at a central portion of the disk.

Figure 2:
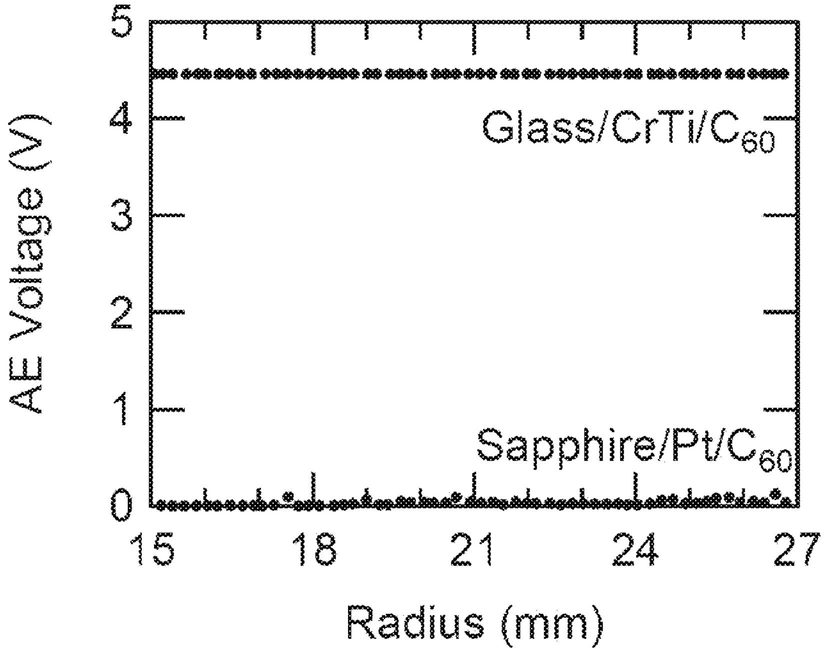
FIG. 2 is a graph illustrating a result obtained by performing a head flight test with respect to the recording medium of the present invention.

FIG. 2 illustrates a result obtained by performing the head flight test with respect to the disc-shaped recording medium (diameter: 65 mm) of a sapphire substrate/a Pt layer (film thickness: 10 nm)/a $C_{60}$ layer (film thickness: 3 nm) being an example of the present invention, by using a head/disk floating properties evaluating apparatus (product name: HDF tester, manufactured by Kubota Corporation) which is generally used in the head flight test of the current magnetic recording medium of the rotating disk type. That is, a graph illustrates the AE (Acoustic Emission) output voltage (V) at the time of seeking the DFH (Dynamic Flying Height) head in a range of 15 mm to 27 mm in the radial direction from the center on the surface of the $C_{60}$ single crystal thin film of the recording medium by 0.2 mm per 1 second, while fixing the recording medium to the spindle, and rotating the recording medium at 5400 rotations.

From X-ray diffraction, it is confirmed that the Pt layer whose (111) plane is preferentially oriented, and is grown on the sapphire.

FIG. 2 also illustrates a result obtained by performing a similar head flight test with respect to a disk shaped recording medium having a configuration of a glass substrate/a CrTi layer (film thickness: 10 nm)/a $C_{60}$ layer (film thickness: 3 nm) and not including a platinum layer, as a comparative example.

Figure 3:
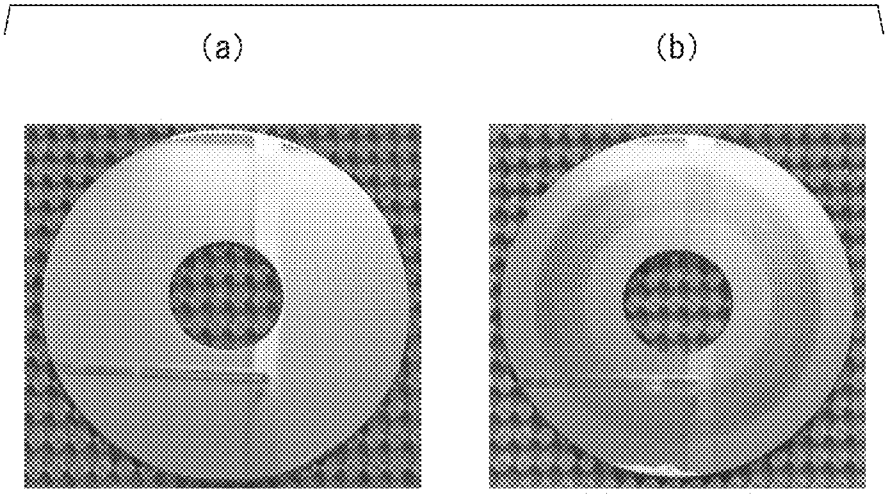
FIG. 3(*a*) is a photograph after the head flight test is performed with respect to a recording medium of an example, and FIG. 3(*b*) is a photograph after the head flight test is performed with respect to a recording medium of a comparative example.

FIG. 3(*a*), and FIG. 3(*b*) respectively illustrate photographs of the disk shaped recording medium after the head flight test described above is performed in the example and the comparative example.

From the photograph of FIG. 3(*b*), it is found out that the $C_{60}$ single crystal thin film of the surface is peeled off in a concentric shape in the comparative example not including a platinum layer whose (111) plane is preferentially oriented. This is a result caused by that the DFH head is in contact with a disk surface in the comparative example of no platinum layer of which the (111) plane is preferentially oriented, as described in the graph of FIG. 2.

On the contrary, in the example, the DFH head could be sought by stably floating without colliding with the surface of the $C_{60}$ single crystal thin film, as seen from the fact that a peeled off portion is not found in the photograph of FIG. 3(*a*), and the AE output voltage (V) is 0.1 V or less in the graph of FIG. 2.

The result indicates that the surface of the $C_{60}$ single crystal thin film formed on the platinum layer whose (111) plane is preferentially oriented is so flat that the DFH head does not collide with the surface in the flight test, in the wide range referred to as the ring-shaped region of an outer diameter of 27 mm from an inner diameter of 15 mm, in comparison with the $C_{60}$ single crystal thin film that does not have the platinum layer of which the (111) plane is preferentially oriented, and is formed on the CrTi layer.

The fact that the head used in the current rotating disk shaped magnetic recording medium stably flew above the recording medium of the present invention, indicates that the same means for recording (writing)•reproducing (reading) as that of the current rotating disk shaped magnetic recording medium can be used in the recording medium of the present invention. That is, it is indicated that moving a head attached to a tip of a swing arm in the substantially radial direction on the surface of the recording medium while rotating the disk shaped recording medium by using a spindle motor, positioning the head at a desired track of a track group formed into a concentric shape in the surface of the recording medium, recording information, and reading the information are possible.

(Platinum Layer)

The platinum layer is a layer whose (111) plane is preferentially oriented (that is, so that a [111] axis is parallel to a normal direction to the surface of the substrate), and is grown on the substrate.

Platinum is exceedingly stable in air, and does not have polarity.

On the (111) plane of the platinum layer, the fullerene thin film is formed so flat that the DFH head does not collide with the surface in the flight test (AE output voltage is 0.1 V or less) in the wide range on the order of 10 mm. If a large grain boundary is present in the fullerene thin film, stable flight of the head becomes difficult. Therefore, it is necessary that a large grain boundary does not exist in the fullerene thin film, and it is preferable that the fullerene thin film is a single crystal film (single crystal thin film). Here, "single crystal thin film" in the fullerene single crystal thin film means a case where the crystal grain boundary substantially present, and this can be evaluated by a half-value width of a rocking curve in an in-plane direction in the X-ray diffraction of the thin film as described later.

In the platinum layer, it is preferable that the film thickness is 5 nm to 30 nm. The reason is because the thin film that achieves both of crystallinity and flat properties is unlikely to be manufactured in a case of being too thin or too thick.

In the platinum layer, a half-value width of a rocking curve at a (111) diffraction peak in the X-ray diffraction is preferably 0.1° or less, and more preferably 0.01° or less.

Moreover, in the platinum layer, oscillation in a low angle side can be observed preferably over 10° or more, more preferably 15° or more, and further preferably 20° or more in the X-ray diffraction. The fact that the mirror plane oscillation of the low angle side can be observed indicates that the film thickness is very uniform.

(Fullerene Thin Film)

As a fullerene thin film, higher fullerenes such as $C_{70}$, $C_{76}$, $C_{78}$ and $C_{82}$ can be used, in addition to $C_{60}$. But $C_{60}$ is particularly preferable, because high crystallinity is easy to be obtained due to a sphere shape. In a case where the $C_{60}$ thin film is used, it is preferable that purity of $C_{60}$ is as high as possible. But a fullerene other than $C_{60}$ may be included in the $C_{60}$ thin film as long as the effects of the present invention are exhibited. It is preferable that the fullerene thin film is a single crystal thin film.

In order to consider the fullerene thin film as a single crystal thin film, a rocking curve half-value width of a (220) diffraction peak in X-ray diffraction is preferably 4° or less, and more preferably 3° or less.

In the fullerene thin film, it is preferable that the film thickness is 2 nm to 5 nm. The reason is because there is a need for the thickness of two molecules or more of $C_{60}$ since the recording uses a polymerization reaction. If the film thickness is too large, insulation is made, and tunnel current is unlikely to flow even if voltage is applied.

(Method of Manufacturing Fullerene Thin Film)

In a method of manufacturing a fullerene thin film of the present invention, the fullerene thin film is manufactured by forming a platinum layer on a substrate by sputtering, and forming a film of the fullerene on the platinum layer by vacuum evaporation method.

The substrate described above can be used as a substrate.

(Forming of Platinum Layer)

First, a platinum layer is formed on a substrate. The platinum layer is formed on the substrate by sputtering method. The substrate temperature in a step of the sputtering is appropriately controlled to be a certain temperature preferably in a range of 400° C. to 900° C., and more preferably in a range of 750° C. to 850° C. If being within the range, the platinum layer of fine crystallinity can be formed. That is, if the substrate temperature in the step of the sputtering is set in a range of 400° C. to 900° C., it is possible to form the platinum layer whose (111) plane where the rocking curve half-value width of the (111) diffraction peak is 0.1° or less in X-ray diffraction is preferentially oriented. And if the substrate temperature is set in a range of 750° C. to 850° C., it is possible to form the platinum layer whose (111) plane where the rocking curve half-value width of the (111) diffraction peak is 0.01° or less in X-ray diffraction is preferentially oriented (see FIG. 6).

After the above step, annealing is preferably performed in order to form the platinum layer of fine crystallinity.

The annealing is performed by appropriately controlling the substrate temperature in a range of 400° C. to 900° C., and more preferably in a range of 750° C. to 850° C. The annealing time is preferably 5 minutes to 30 minutes.

(Forming of Fullerene Thin Film)

The fullerene thin film is formed on the platinum layer by vacuum evaporation method with fullerene as an evaporation source.

In order to form the fullerene single crystal thin film of finer crystallinity, the substrate temperature in a step of forming the fullerene thin film is appropriately controlled preferably in a range of 100° C. to 200° C., and more preferably in a range of 160° C. to 200° C. That is, if the substrate temperature in the step of forming the fullerene thin film is set in a range of 100° C. to 200° C., it is possible to form the fullerene single crystal thin film in which the rocking curve half-value width of the (220) diffraction peak is 4° or less in X-ray diffraction. And if the substrate temperature is set in a range of 160° C. to 200° C., it is possible to form the fullerene single crystal thin film in which the rocking curve half-value width of the (220) diffraction peak is 3° or less in X-ray diffraction (see FIG. 7).

After the above step, annealing is preferably performed in order to form the fullerene thin film of finer crystallinity. The annealing is performed by appropriately controlling the substrate temperature in a range of 100° C. to 200° C., and more preferably in a range of 60° C. to 200° C. The annealing time is preferably 5 minutes to 30 minutes.

(Method of Manufacturing Recording Medium)

A method of manufacturing the recording medium of the present invention can be performed by using the method of manufacturing the fullerene thin film of the present invention described above.

(Recording Apparatus)

A recording reproducing apparatus of the present invention includes the recording medium of the present invention.

Figure 8:
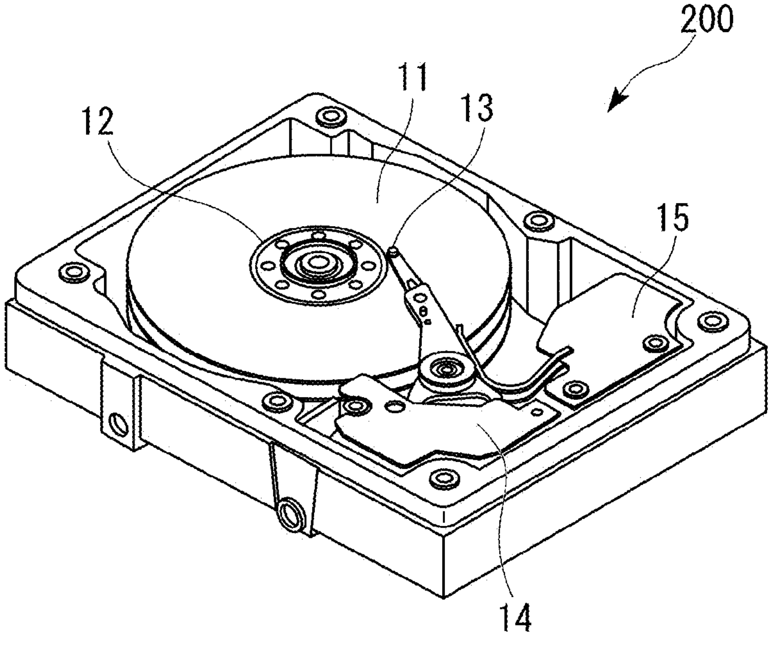
FIG. 8 is a diagram illustrating an example of a structure of a recording reproducing apparatus including the recording medium of the present invention.

FIG. 8 illustrates an example of the recording reproducing apparatus according to an embodiment of the present invention.

A recording reproducing apparatus 100 according to the embodiment includes the recording medium 11 of the present invention, a medium driving unit 12 that rotatably drives the recording medium 11, a reading/writing head (flying head) 13 that performs writing of information with respect to the recording medium 11, and reading of the recorded information by an electrical method, a head driving unit 14 that moves the reading/writing head 13 relatively to the recording medium 11, and a recording reproducing signal processing system 15 that performs processing of an electrical signal in order to perform reading/writing of information with respect to the recording medium 11 by the reading/writing head 13.

The recording reproducing signal processing system 15 can send a recording signal to the reading/writing head 13 by processing data input from the outside, and can send data to the outside by processing a reproducing signal from the reading/writing head 13.

Here, the reading/writing head is a head in which the reading head and the writing head are integrated. Moreover, the reading/writing head is preferably a DFH (Dynamic Flying Height) type head having a control function of a head flying height due to thermal expansion.

(Information Recording Method)

An information recording method of the present invention is a method of recording information in the fullerene thin film by using the recording medium which is the recording medium of the present invention, that is a disk shaped recording medium, wherein the information is recorded in the fullerene thin film by, while the recording medium is rotating, making a writing head approach the surface of the fullerene thin film of the recording medium, moving the writing head in an approximately radial direction of the recording medium, positioning the writing head at a desired track of concentric tracks, and locally applying a voltage of a predetermined intensity to the fullerene thin film with the writing head.

In the information recording method of the present invention, the method of PTL 1 can be used as an example of a principle of the information recording.

(Information Reading Method)

An information reading method of the present invention is a method of reading the information which is recorded in the fullerene thin film by using the information recording method of the present invention, in which the recorded information is read by making a reading head approach the surface of the fullerene thin film of the recording medium while rotating the recording medium, moving the reading head in an approximately radial direction of the recording medium, positioning the reading head at a desired track of concentric tracks, and detecting the difference of current between a spot where the information is recorded and a spot where the information is not recorded with the reading head.

In the information reading method of the present invention, the method of PTL 1 can be used as an example of a principle of the information reading.

The recording (writing) of information is possible by applying the voltage, and making the tunnel current flow. Since the fullerene single crystal thin film is an insulator, the current does not flow. However, if the voltage of a fixed level or more is applied, the tunnel current flows due to a tunnel effect. At that time, the fullerene molecules are polymerized to form a polymer, and have metallic electrical conductivity. Here, if tunnel resistance is measured in the polymerized place and the non-polymerized place, a difference is detected. Therefore it is possible to perform the recording of the information by using tunnel current. It is possible to distinguish a place where the tunnel current flows from a place where the tunnel current does not flow in the fullerene single crystal thin film. That is, if, at the place where the tunnel current flows once by applying voltage, the same voltage is applied once more, the tunnel current which is larger than that of the first time flows. In this manner, it is possible to perform the recording of information by applying a voltage to flow tunnel current, and making difference in magnitude of the flowing tunnel current.

On the other hand, it is possible to read (reproduce) the recorded information by detecting the difference in magnitude of the flowing tunnel current. Furthermore, if the voltage is applied to a reverse direction, the tunnel current returns to a value of the tunnel current which flows at the first time. Therefore, deleting is possible.

In order to apply the above principle to the writing, the reading and the deleting of a hard disk system, a head tip must be always controlled at a fixed flying height from the surface of the recording medium. Since the tunnel current is very small, a mechanism that reads the change of the tunnel current must be incorporated into the head. The current flowing through the fullerene single crystal thin film which is an insulating layer flows through the platinum layer in the in-plane direction, passes through an external circuit once through the spindle, and returns to the head thereafter. For example, in a case of the recording medium of a sapphire substrate/a platinum layer/a fullerene single crystal thin film, the sapphire substrate, and the fullerene single crystal thin film are also in contact with the spindle, but the current does not flow in these substrate and film in the in-plane direction due to high resistance in comparison with the platinum layer. In order to perform the writing and the reading with respect to the recording medium in the hard disk system, a sensor that detects the tunnel current must be incorporated into the head. As a mechanism for allowing the head to fly, a mechanism that is the same type of a mechanism used in the current hard disk head can be used. Since the current hard disk already achieves the flying height of 10 Å (which is substantially the same as the distance between the recording medium and the probe in the information recording using the probe of the STM of PTL 1) by using the DFH head at the time of the reading and writing, it is possible to use the similar mechanism thereto.

EXAMPLES

Hereinafter, the present invention will be described in more detail with reference to examples, but the following examples are for easily making understanding of the present invention, and the present invention is not at all limited by the examples.

(Forming of Platinum Layer)

A sapphire substrate having a diameter of 2 inches (approximately 50 mm) whose (0001) surface was polished flat was prepared, and a substrate temperature was retained at 800° C. for approximately 10 minutes. Thereby, it is possible to remove impurities, and to expose a clean surface.

Next, a film of platinum was formed on the substrate at the substrate temperature of 800° C. by sputtering. Conditions of the sputtering were chamber ultimate vacuum of $1\times10^{-5}$ Pa, film forming Ar pressure of 0.2 Pa, film forming power of 80 W, and film forming time of 20 seconds. Next, the substrate temperature was retained at 800° C., and annealing was performed for 10 minutes in a vacuum. The sputtering was performed by a DC magnetron sputtering apparatus.

(Forming of Fullerene Single Crystal Layer)

Next, fullerene $C_{60}$ was put into a resistance heating type evaporation source crucible, the crucible was heated, $C_{60}$ was sublimated, and a $C_{60}$ single crystal thin film was formed on the platinum layer by the vacuum evaporation. A vacuum degree at the time of forming the film was $1\times10^{-5}$ Pa, the temperature of the evaporation source was approximately 380° C., the film forming time was 30 seconds, and the substrate temperature was 180° C.

Next, the substrate temperature was retained at 180° C. for 5 minutes, and the annealing was performed in a vacuum. Crystallinity of $C_{60}$ was further improved by the annealing.

Figure 4:
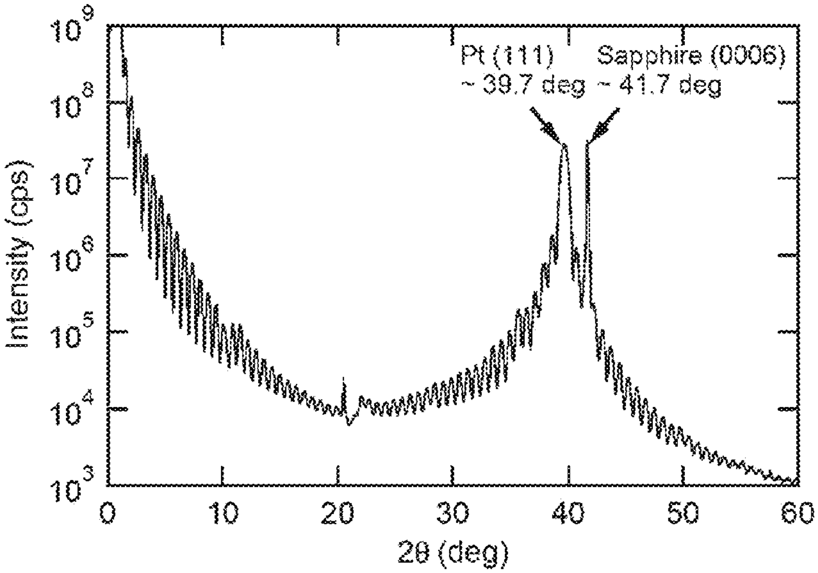
FIG. 4 is a measurement result of X-ray diffraction of the example.

A result of X-ray diffraction in an interplanar direction of the $C_{60}$ single crystal thin film is illustrated in FIG. 4. In the X-ray diffraction result, only a platinum (111) diffraction peak, and a sapphire (0006) diffraction peak were confirmed. The low-angle oscillation and Laue oscillation in the vicinity of the platinum (111) diffraction peak indicate that an interface between the platinum and the sapphire is very clearly defined, a film thickness of the platinum is uniform, and epitaxial growth of the platinum is made on the sapphire.

Figure 5:
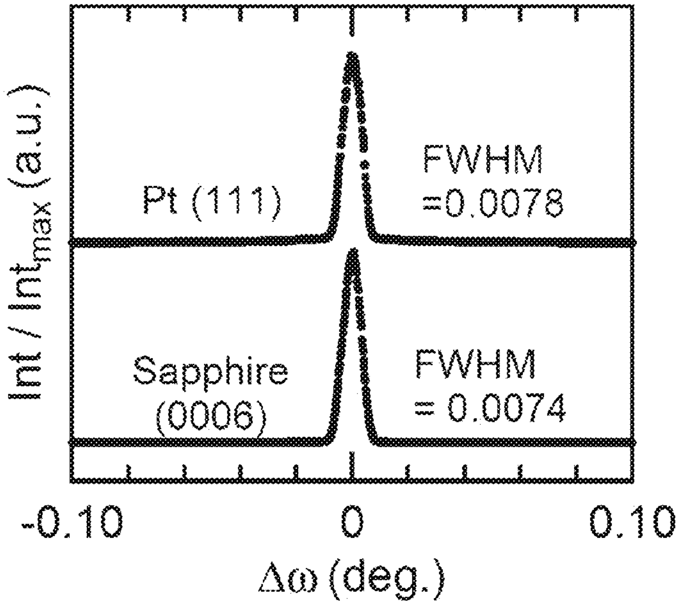
FIG. 5 are rocking curves with a platinum (111) diffraction peak and a sapphire (0001) (0006) diffraction peak in the X-ray diffraction of the example.

FIG. 5 illustrates rocking curves of the platinum (111) diffraction peak and the sapphire (0006) diffraction peak in the single crystal thin film. A half-value width (FWHM) of the rocking curve provides information on the crystallinity of the platinum. It is found out that the platinum is grown with substantially the same crystallinity as that of a sapphire single crystal substrate under performing conditions, and it is possible to realize very fine crystallinity. Since obtained is the result that the half-value width of platinum (111) diffraction peak is 0.01° or less in 90% or more of arbitrary measurement spots on the sapphire substrate of 2 inches, it is found out that the thin film of fine crystallinity in a large area is formed.

Figure 6:
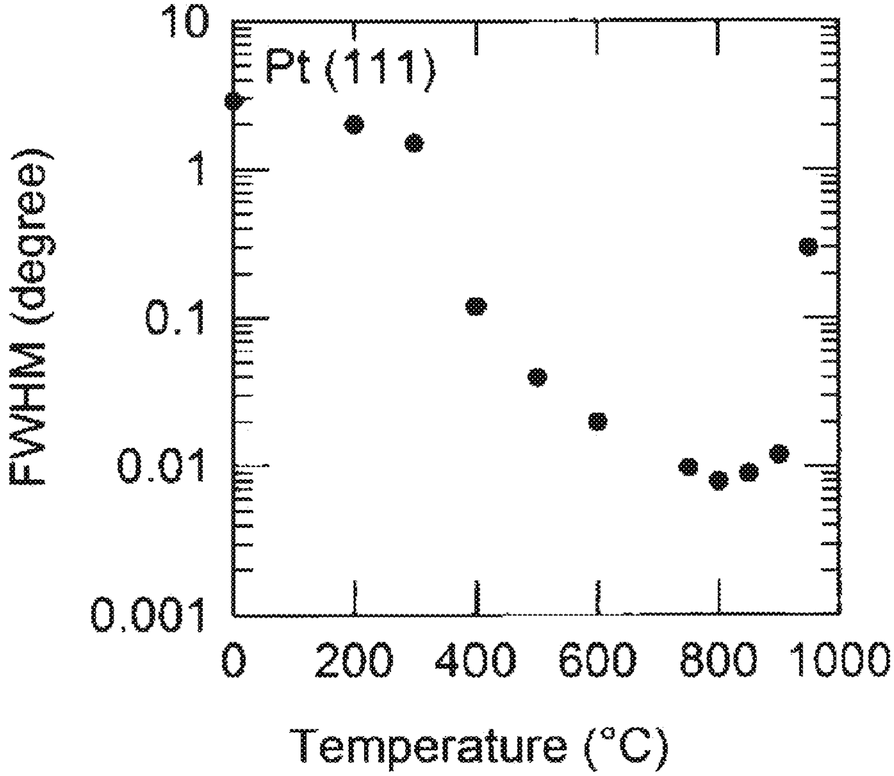
FIG. 6 is a relationship between a rocking curve half-value width of the platinum (111) diffraction peak and a substrate temperature at the time of sputtering.

FIG. 6 illustrates a relationship between the rocking curve half-value width of platinum (111) diffraction peak and the substrate temperature at the time of the sputtering. In particular, the half-value width is narrow between 400° C. and 900° C., and the half-value width is 0.01° or less between 750° C. and 850° C., and it is found out that orientation properties between the planes are fine.

Figure 7:
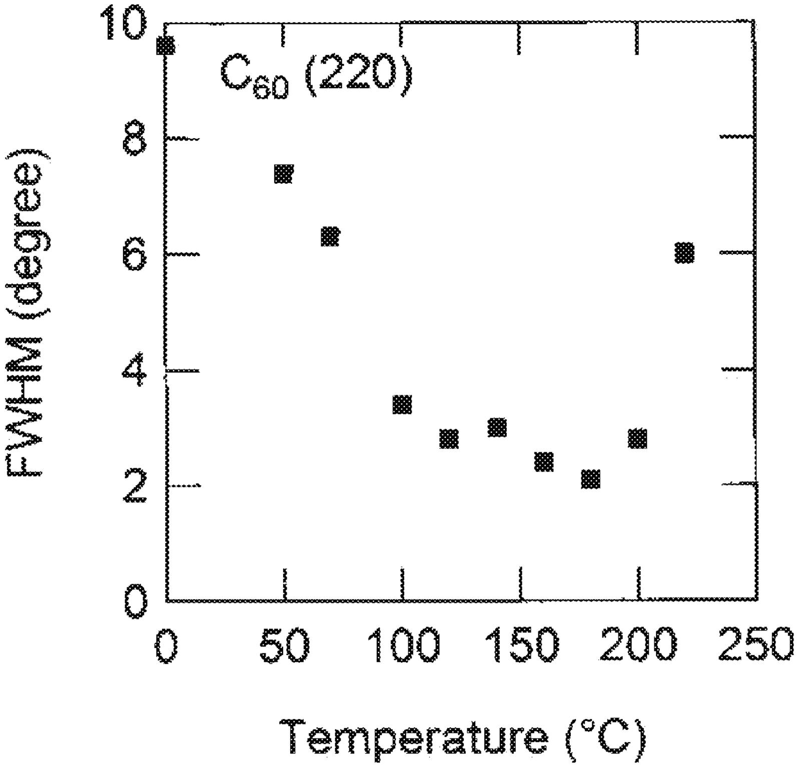
FIG. 7 is a relationship between a rocking curve half-value width of a $C_{60}$ (220) diffraction peak and the substrate temperature at the time of the sputtering.

Since the diffraction peak of $C_{60}$ (111) was buried in the mirror plane oscillation of the platinum layer, the temperature dependence of the crystallinity of $C_{60}$ was evaluated by the rocking curve of (220) diffraction peak. FIG. 7 illustrates the relationship between the rocking curve half-value width of $C_{60}$ (220) diffraction peak and the substrate temperature at the time of the sputtering. The half-value width is narrow between 100° C. and 200° C., and the half-value width becomes further narrow between 160° C. and 200° C., and it is found out that the in-plane orientation properties are fine.

Figure 9:
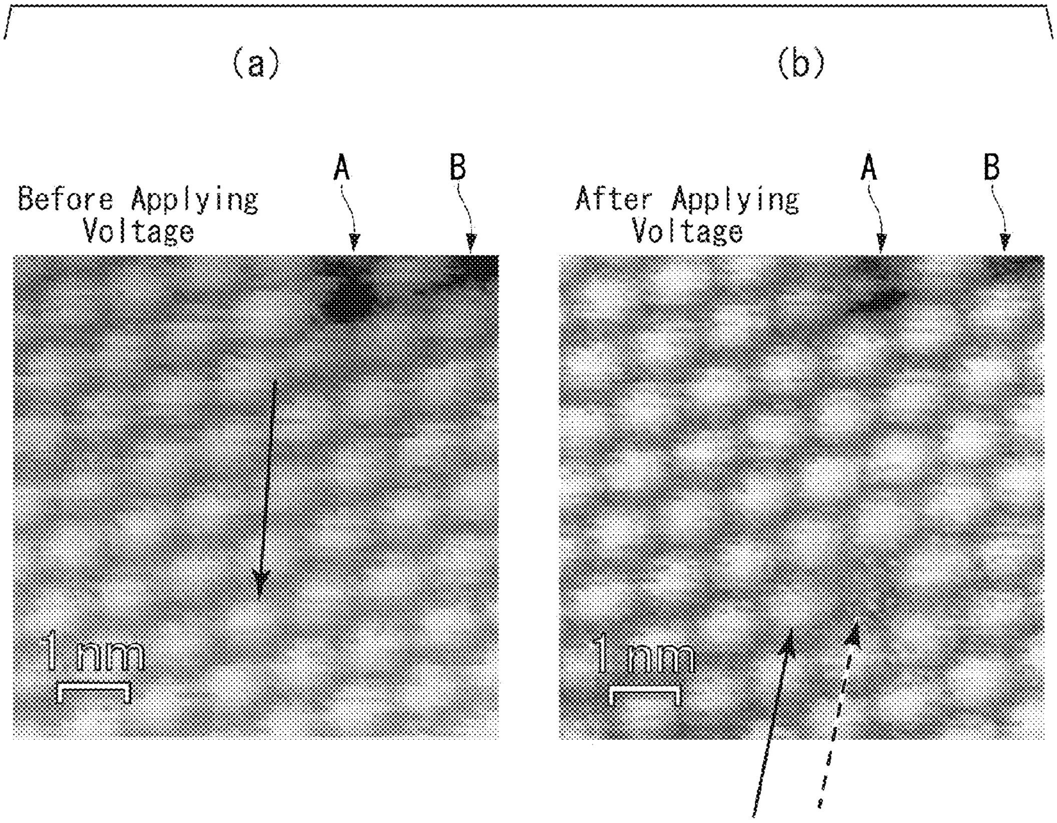
FIG. 9(*a*) is a STM (scanning tunneling microscope) image before a voltage is applied to a $C_{60}$ thin film of the recording medium of the present invention, and (b) is a STM image after the voltage is applied.

FIG. 9 is a STM image before and after a voltage is applied to the $C_{60}$ single crystal thin film by a scanning tunneling microscope (STM: manufactured by Scienta Omicron GmbH), with respect to the recording medium of the present invention which is configured with a sapphire substrate/a platinum layer/a $C_{60}$ single crystal thin film. (a) is a case before applying the voltage, and (b) is a case after applying the voltage. Each luminescent point of a sphere shape is a $C_{60}$ molecular image of the surface.

Manufacturing conditions of the recording medium are as follows;

Substrate: Sapphire 2.5 inches, and plane orientation (0001)

Pt sputtering: 100 W, 20 seconds, Ar gas 0.27 Pa, and substrate temperature of 500° C.

$C_{60}$ evaporation: 400° C., 20 seconds, and substrate temperature of 190° C.

A probe made of tungsten is used as a probe of the STM, and scanning conditions for the observation, and voltage applying conditions for the recording are as follows;

Normal scanning conditions: 2 V, and 0.2 nA

Recording voltage conditions: −3.5 V, 1 nA (constant current mode), and 1 second In each of FIG. 9(*a*) and FIG. 9(*b*), a $C_{60}$ molecule to which the voltage is applied, and a $C_{60}$ molecule in which the molecular image is changed (tunnel current is changed) can be identified, from positions of defects indicated by a sign A and a sign B.

The voltage for the recording was applied immediately above the $C_{60}$ molecular image indicated by an arrow in FIG. 9(*a*).

The $C_{60}$ molecular image indicated by the left-side arrow of two arrows in FIG. 9(*b*) is the $C_{60}$ molecular image indicated by the arrow in (*a*).

When the voltage for the recording is applied immediately above the $C_{60}$ molecular image indicated by the left-side arrow, it is found that the luminescent point of the $C_{60}$ molecular image adjacent to the $C_{60}$ molecular image becomes weak.

The observation of the STM image illustrated in FIG. 9 is performed with respect to the recording medium which is exposed to the atmosphere for approximately 24 hours after the recording medium is manufactured, and it is found out that the recording medium of the present invention is very stable in the atmosphere.

REFERENCE SIGNS LIST

1 SUBSTRATE
2 PLATINUM LAYER
3 FULLERENE SINGLE CRYSTAL THIN FILM
11 RECORDING MEDIUM
12 MEDIUM DRIVING UNIT
13 READING/WRITING HEAD
14 HEAD DRIVING UNIT
15 RECORDING REPRODUCING SIGNAL PROCESSING SYSTEM
100 RECORDING MEDIUM
200 RECORDING REPRODUCING APPARATUS

The invention claimed is:

1. A recording medium comprising:

a substrate;

a platinum layer formed on the substrate and having a (111) plane preferentially oriented; and a fullerene thin film formed on the platinum layer and configured to be a recording layer, wherein an average value of average surface roughness Ra's with respect to four or more visual fields measured by using an atomic force microscope in a surface of the fullerene thin film is 0.5 nm or less.

2. The recording medium according to claim 1, wherein the fullerene thin film is a single crystal thin film.

3. The recording medium according to claim 1, wherein a rocking curve half-value width of a (111) diffraction peak in X-ray diffraction of the platinum layer is 0.1° or less.

4. The recording medium according to claim 1, wherein a rocking curve half-value width of a (220) diffraction peak in X-ray diffraction of the platinum layer is 4° or less.

5. The recording medium according to claim 1, wherein the substrate has a disk shape.

6. The recording medium according to claim 5, wherein in a head flight test which is performed by rotating the recording medium, and using a DFH (Dynamic Flying Height) head, an AE (Acoustic Emission) output voltage is 0.1 V or less at the time of seeking the DFH head above the surface of the fullerene thin film.

7. The recording medium according to claim 1, wherein the substrate is a sapphire substrate.

8. A recording reproduction apparatus comprising:

the recording medium according to claim 1.

9. The recording reproducing apparatus according to claim 8, further comprising:

a medium driving unit that rotatably drives the recording medium;

a reading/writing head that performs writing of information, and reading of the recorded information with respect to the recording medium by an electrical method;

a head driving unit that moves the reading/writing head relatively to the recording medium; and a recording reproducing signal processing system that performs processing of an electrical signal in order to perform reading/writing of information with respect to the recording medium by the reading/writing head.

10. An information recording method of recording information in the fullerene thin film by using the recording medium according to claim 1, that is a disk shaped recording medium, wherein the information is recorded in the fullerene thin film by, while the recording medium is rotating, making a writing head approach the surface of the fullerene thin film of the recording medium, moving the writing head in an approximately radial direction of the recording medium, positioning the writing head at a desired track of concentric tracks, and locally applying a voltage of a predetermined intensity to the fullerene thin film with the writing head.

11. An information reading method of reading information which is recorded in the fullerene thin film by using the information recording method according to claim 10, wherein the recorded information is read by, while the recording medium is rotating, making a reading head approach the surface of the fullerene thin film of the recording medium, moving the reading head in an approximately radial direction of the recording medium, positioning the reading head at a desired track of concentric tracks, and detecting the difference of current between a spot where the information is recorded and a spot where the information is not recorded with the reading head.

* * * * *